A. SMITH.
Mash ~~Liquid~~ Cooler.

No. 41,024.

Patented Dec. 22, 1863.

Witnesses:
Isaac Lithauer
Andrew DeLay

Inventor:
Addison Smith
By P. N. McIntire
Attorney

UNITED STATES PATENT OFFICE.

ADDISON SMITH, OF NEW YORK, N. Y.

IMPROVED MODE OF COOLING MASH OF BEER, &c.

Specification forming part of Letters Patent No. 41,025, dated December 22, 1863.

*To all whom it may concern:*

Be it known that I, ADDISON SMITH, of New York, of the county of New York, in the State of New York, have invented a new Method of Cooling Mashes of Beer and other Masses of Semi-Liquid Material; and I do hereby declare that the following is a full and exact description thereof, reference being had to the accompanying drawings, making part of this specifiation.

My invention relates to a new method of cooling the mash of beer, by forcing numerous currents of air through the mass of heated or warm material while it is kept agitated.

Previous to my invention it has been customary to cool the mash of beer by placing the semi-liquid mass of material in a tank or receiver, and while keeping it in a state of agitation blow blasts of air onto the mass; but with this process or method of cooling it is necessary to continue the operation for a long time, and it is not very effective, on account of the difficulty in bringing all the particles of the material in contact with the blasts or currents of cooling medium.

My new process of cooling with blasts of air consists in carrying the blasts down to near the bottom of the mass of material to be cooled and allowing it to escape there into the mass, while at the same time the latter is kept in a state of agitation by a stirring apparatus, whereby numerous currents of cold air are forced up through the mass of material in every direction, while the particles of the mass are kept in motion, and each and all affected by the cooling-currents. And my invention also consists in an apparatus for performing this process of cooling, consisting of a suitable tank or receptacle for the mass of material to be operated upon, in combination with a stirring device composed of numerous hollow arms, through which blasts of air are forced down during the motion of the said arms, all as hereinafter more fully explained.

To enable those skilled in the art to make and use my invention, I will now proceed to fully describe it, referring by letters to the accompanying drawings, forming part of this specification, and in which—

Figure 3:
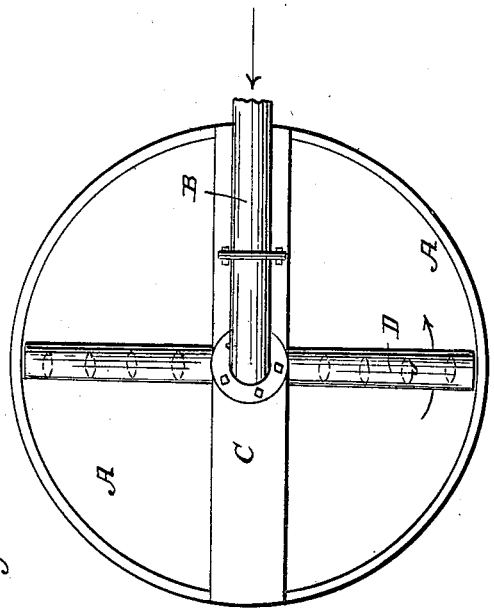
Figure 4:
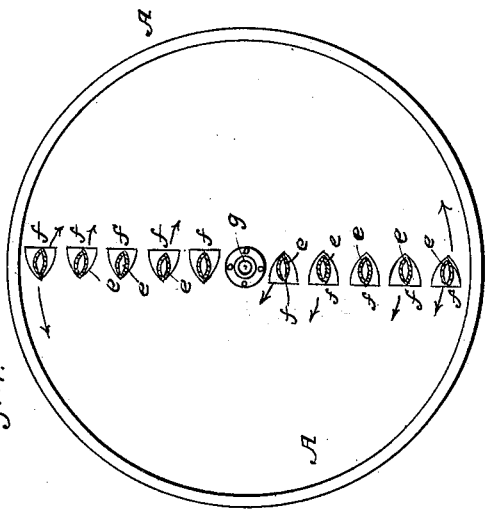
Figure 1:
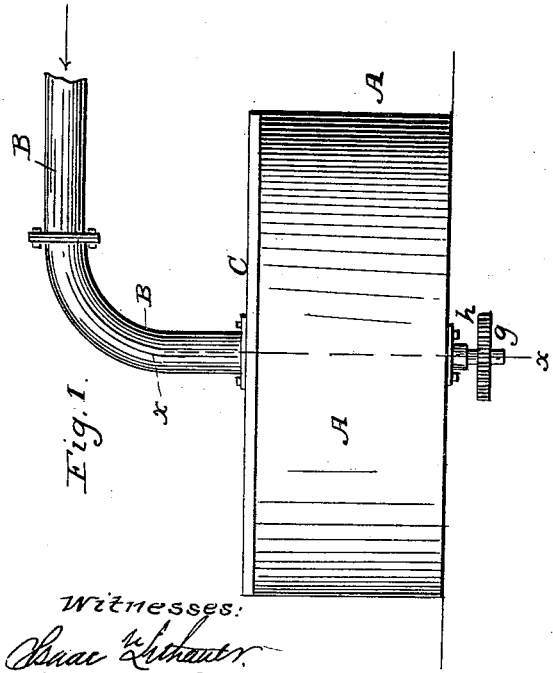
Figure 2:
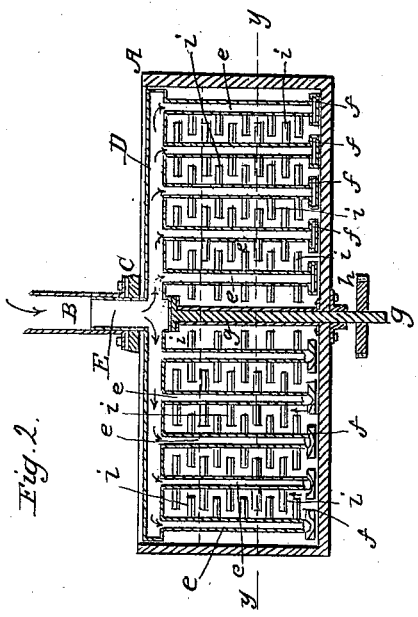

Figure 1 is a side elevation of my new apparatus for cooling the mash of beer. Fig. 2 is a vertical section of the same at the line *x x*, Fig. 1. Fig. 3 is a top view of the same; and Fig. 4 is a horizontal section at the line *y y*, Fig. 2.

In the several figures the same part will be found designated by the same letter of reference.

In the sectional views I have tinted blue those spaces which are filled with the blasts of air, (which move as indicated by the small red arrows.)

The dotted line in Fig. 2 indicates the level (or top surface) of the material in the tank, and the black arrows indicate the directions of motion of the several parts of the stirring machinery.

A is a large cylindrical tank, which I propose to make about ten feet in diameter and three feet deep, of any suitable material. Arranged centrally across the top of this tank A is a beam, C, through which, at its center, is made a hole to accommodate the pipe E. This pipe E is about ten inches in diameter, and has two smaller pipes, D D, branching off from it in a line with each other and at right angles to E, as clearly seen at Figs. 2 and 3. The lower end of pipe E is secured to the upper end of a vertical shaft, *g*, which passes up through a suitable bearing in the bottom of tank A, and which is provided beneath the tank with a gear or pinion, *h*, to which is coupled or engaged suitable driving machinery, while the upper end of shaft E is fitted to run within the pipe B, which is bolted or otherwise suitably secured to beam C, and through which the blast from a suitable blower is conducted.

*e e*, &c., are vertical tubes or hollow arms, which extend downward from the tubes D D to near the bottom of the tank, and which are provided at their lower ends with hollow shoe-pieces *f f*, &c., of about a triangular shape, as illustrated. The arms *e e*, &c., it will be seen, are elliptical in a cross-section, the object of such shape being to enable them to pass readily through the mass of material. The tubes D D, I propose to make in the shape of half-cylinders, to afford a flat under side to bolt the vertical tubes *e* onto. The capacity of the tubes D D should be about one-half (each of them) that of the pipe E, and the aggregate of all the tubes *e* should be about equal in capacity (or a little more) to the tube E. The shoes *f* are so shaped as to run easily through the mass of material and allow the blasts or currents of air to escape in a rectangular column from their rear open sides. The vertical tubes $e$ $e$ are provided with numerous teeth, $i$ $i$, &c., which project from their external surface at about right angles, and so as to extend in between each other on the adjacent tubes, as seen at Fig. 2. These teeth $i$, I propose to make in the form of strips or slats, and set them obliquely in a cross-section, so that they shall exert a greater tendency to thoroughly agitate the mass of the material as they travel through it.

The operation of the above described machinery or apparatus will be readily understood, and is as follows, viz: The tank A being nearly filled with the mash of beer or other material to be cooled, the shaft $g$ is caused, through the medium of its gear $h$, connected to suitable driving machinery, to rotate, carrying with it the tube E and the tubes D D and $e$, attached thereto, in the direction indicated by the black arrows. At the same time a very strong blast of air is supplied from a suitable blower to the stationary pipe B, and passes from said pipe B into and through the tubes D and $e$ and shoes $f$, escaping from the latter into the mass of material, as illustrated by the red arrows. It will be understood that since the blasts or currents escape from the rear ends or sides of the moving shoes $f$ into the agitated mass, they will wend their way upward through the mass in numerous directions; and it will be seen that the obliquity of the interlocking slats $i$ not only tends to increase the disintegration of the particles of the mass, but also tends to induce the currents of air ascending to take a greater number of paths and be more minutely split up, and consequently to come into contact with a greater number of the particles of the mass.

It will be understood that the forms and proportions of the parts of the apparatus described may be varied without essentially affecting its results, and in practicing my invention it may be found expedient to change somewhat the construction and arrangement of the parts. For instance, a greater or less number of stirring and air-conducting arms may be used, and in lieu of the peculiarly-shaped shoes $f$ others of a different form may be employed; or the lower ends of the tubes $e$ may communicate with, and be attached to, a single continuous bottom piece, hollow, and having openings at intervals for the escape of the blast, or having a long slit or continuous opening for the escape of the air, the whole object and intent of the invention being to emit strong blasts of air near the bottom of the mass, which will be induced, while the mass is kept in motion or agitation, to ascend, broken up, and come in contact with and cool the particles of the mass.

It is obvious that my new apparatus may be employed to force a heating medium in contact with the particles of a mass of material to be warmed, as well as to perform the operation of cooling, as hereinbefore explained.

Having fully described my new process of cooling and apparatus for carrying it on, what I claim as new, and desire to secure by Letters Patent, is—

1. The process of cooling the mash of beer, substantially as hereinbefore described—that is, by discharging blasts of air into the mass of material beneath its surface while the mass is agitated.

2. A cooling apparatus consisting of a hollow stirring apparatus provided with a blast of air, in connection with a suitable reservoir for the material, all operating substantially as set forth.

In testimony whereof I have hereunto set my hand and seal this 4th day of November, 1863.

ADDISON SMITH. [L. S.]

In presence of—
 J. N. McINTIRE,
 M. M. LIVINGSTON.